US009470598B2

(12) United States Patent
Sato et al.

(10) Patent No.: US 9,470,598 B2
(45) Date of Patent: Oct. 18, 2016

(54) PRESSURE DETECTION DEVICE AND METHOD FOR PRODUCING SAME

(71) Applicant: NIPPON SEIKI CO., LTD., Niigata (JP)

(72) Inventors: Shuji Sato, Niigata (JP); Yoshihiro Kamimura, Niigata (JP); Keiji Tsurumaki, Niigata (JP); Shigeki Koide, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 161 days.

(21) Appl. No.: 14/396,723

(22) PCT Filed: Apr. 5, 2013

(86) PCT No.: PCT/JP2013/060437
§ 371 (c)(1),
(2) Date: Oct. 23, 2014

(87) PCT Pub. No.: WO2013/161542
PCT Pub. Date: Oct. 31, 2013

(65) Prior Publication Data
US 2015/0330858 A1 Nov. 19, 2015

(30) Foreign Application Priority Data
Apr. 25, 2012 (JP) .................................. 2012-100317

(51) Int. Cl.
*G01L 19/14* (2006.01)
*G01L 19/06* (2006.01)
*G01L 9/00* (2006.01)

(52) U.S. Cl.
CPC ........... *G01L 19/14* (2013.01); *G01L 19/0618* (2013.01); *G01L 19/142* (2013.01); *G01L 19/147* (2013.01); *G01L 9/0042* (2013.01); *Y10T 29/49119* (2015.01)

(58) Field of Classification Search
None
See application file for complete search history.

(56) References Cited

U.S. PATENT DOCUMENTS 6,176,137 B1 * 1/2001 Sasaki ................. G01L 19/0038
73/754
6,564,645 B1 * 5/2003 Nakano ................. G01L 19/147
73/756

(Continued)

FOREIGN PATENT DOCUMENTS

JP      11-351990 A     12/1999
JP    2002-257663 A     9/2002

OTHER PUBLICATIONS

International Search Report issued in International Application No. PCT/JP2013/060437 mailed May 7, 2013, with English translation.

*Primary Examiner* — Andre Allen
(74) *Attorney, Agent, or Firm* — McDermott Will & Emery LLP

(57) ABSTRACT

Provided are a pressure detection device having a fail-safe structure for minimizing leaking out of a fluid targeted for pressure detection, and a method for producing the same. A pressure detection device is provided with: a fluid inflow member having a flow path; a pressure sensor for detecting the pressure of the fluid that has flowed into the flow path; a base plate unit having a first resin section surrounding the pressure sensor; a lid section which is bonded to the first resin section so as to cover the pressure sensor from above, and forms a sealed space in the interior of which the pressure sensor is located; a terminal unit; and a resin cover section for bonding the fluid inflow member, the base plate unit, the lid section, and the terminal unit. The lid section is bonded to the first resin section and is pushed on from above by the resin cover section.

7 Claims, 5 Drawing Sheets

(56) References Cited

U.S. PATENT DOCUMENTS

| | | | | |
|---|---|---|---|---|
| 2005/0132813 A1* | 6/2005 | Aratani | G01L 19/0084 | 73/715 |
| 2005/0199068 A1* | 9/2005 | Yoshino | G01L 19/0084 | 73/715 |
| 2006/0075821 A1* | 4/2006 | Otsuka | G01L 19/0084 | 73/715 |
| 2006/0090569 A1* | 5/2006 | Myagawa | G01L 19/0084 | 73/753 |
| 2006/0107750 A1* | 5/2006 | Tanaka | G01L 19/147 | 73/754 |
| 2006/0213276 A1* | 9/2006 | Ueyanagi | G01L 19/0084 | 73/754 |
| 2008/0257053 A1* | 10/2008 | Makita | G01L 19/0038 | 73/715 |
| 2009/0049921 A1* | 2/2009 | Otsuka | G01L 19/0069 | 73/706 |
| 2009/0071259 A1* | 3/2009 | Tanaka | G01L 9/0042 | 73/725 |
| 2009/0095059 A1* | 4/2009 | Matsui | G01L 23/18 | 73/114.18 |
| 2015/0128715 A1* | 5/2015 | Kamimura | G01L 19/0084 | 73/754 |
| 2016/0069765 A1* | 3/2016 | Ishikawa | G01L 9/0051 | 73/431 |

\* cited by examiner

PRESSURE DETECTION DEVICE AND METHOD FOR PRODUCING SAME

RELATED APPLICATIONS

This application is the U.S. National Phase under 35 U.S.C. §371 of International Application No. PCT/JP2013/060437, filed on Apr. 5, 2013, which in turn claims the benefit of Japan Application No. 2012-100317, filed on Apr. 25, 2012, the disclosures of which Applications are incorporated by reference herein.

TECHNICAL FIELD

The present invention relates to a pressure detection device and a method for producing the device.

BACKGROUND ART

As a conventional detection device, for example, there is the one disclosed in Patent Literature 1. The pressure detection device according to Patent Literature 1 is provided with a lower case having a pressure introducing section which introduces a pressure of a fluid; a pressure sensor (a semiconductor type pressure sensor) which is arranged on the pressure introducing section via a base plate; a circuit board which is electrically connected by the pressure sensor and a wire; an upper case which is arranged by thermally caulking the upper case to the lower case, and which houses the base plate, the pressure sensor, and the circuit board or the like, and forms a connector section, wherein an electric power conducting structure is constructed in order of the circuit board, a first lead terminal, a first lead pin at which a penetration capacitor for absorbing an external noise is arranged, and an electrode lead which is exposed from the connector section.

CITATION LIST

Patent Literature

Patent Literature 1: Japanese Unexamined Patent Application Publication No. 2002-257663

SUMMARY OF THE INVENTION

Problems to be Solved by the Invention

In the pressure detection device according to Patent Literature 1, although an upper part of the pressure sensor is approximately covered with the upper case, because of a structure in which a space is produced between the pressure sensor and the upper case, if an excessive pressure is applied to the pressure sensor due to a fluid flowing inside from the pressure introducing section, it is impossible to wipe out a possibility that the pressure sensor breaks, the fluid leaks out to a space of the upper part of the pressure sensor and further to the upper part of the upper case, and the fluid flows out to the outside of the device. Thus, in recent years when a failsafe structure is desired, there has been room for improvement.

The present invention has been made in view of the circumstance mentioned above, and it is an object of the present invention to provide a pressure detection device and a method for producing the device having a failsafe structure which restrains to the utmost a leakage of a fluid of which a pressure is targeted to be detected.

Means for Solving the Problem

In order to achieve the above object, a pressure detection device according to a first aspect of the present invention, comprising:

a fluid inflow member having a flow passageway into which a fluid can be flown;

a semiconductor type pressure sensor which is provided on a top face of the fluid inflow member, and detects a pressure of the fluid having flown into the flow passageway;

a first unit having:
a first resin section which is provided on the top face of the fluid inflow member, and surrounds the semiconductor type pressure sensor; and
a first lead terminal which is retained by the first resin section, one end part of which is electrically connected to the semiconductor type pressure sensor;

a lid section which is coupled to the first resin section so as to cover the semiconductor type pressure sensor from an upper side, and forms a closed space in which the semiconductor type pressure sensor is internally positioned;

a second unit having:
a second resin section to cover the lid section from an upper side; and
a second lead terminal which is retained by the second resin section, and is electrically connected to an other end part of the first lead terminal; and a resin cover section which couples the fluid inflow member and the first unit and the lid section and the second unit, and covers the first unit, the lid section, and the second unit, while a part of the second lead terminal of the second unit is exposed to an outside, wherein the lid section is coupled to the first resin section, and is pressed by the resin cover section from an upper side.

In order to achieve the above object, a method for producing pressure detection devices according to second aspect of the present invention, the method comprising the steps of:

on a top face of a fluid inflow member having a flow passageway into which a fluid can flow, providing a semiconductor type pressure sensor which detects a pressure of the fluid having flown into the flow passageway;

at an upper side of the fluid inflow member, disposing a first unit having a first resin section surrounding the semiconductor type pressure sensor and a first lead terminal which is retained by the first resin section, one end part of which is electrically connected to the semiconductor type pressure sensor;

coupling a lid section covering the semiconductor type pressure sensor from an upper side to the first resin section and then by the lid section, forming a closed space in which the semiconductor type pressure sensor is internally positioned;

at an upper side of the lid section, disposing the second unit having a second resin section and a second lead terminal which is retained by the second resin section, and is electrically connected to an other end part of the second lead terminal; and subsequent to disposing the second unit, coupling the fluid inflow member and the first unit and the lid section and the second unit and covering the first unit, the lid section, and the second unit, while a part of the second lead terminal of the second unit is exposed to an outside and a resin cover section to press the lid section from an upper side is molded by outsert molding.

Effect of the Invention

According to the present invention, there can be provided a pressure detection device and a method for producing the device having a failsafe structure which restrains to the utmost a leakage of a fluid of which a pressure is targeted to be detected.

MODE FOR CARRYING OUT THE INVENTION

Figure 1:
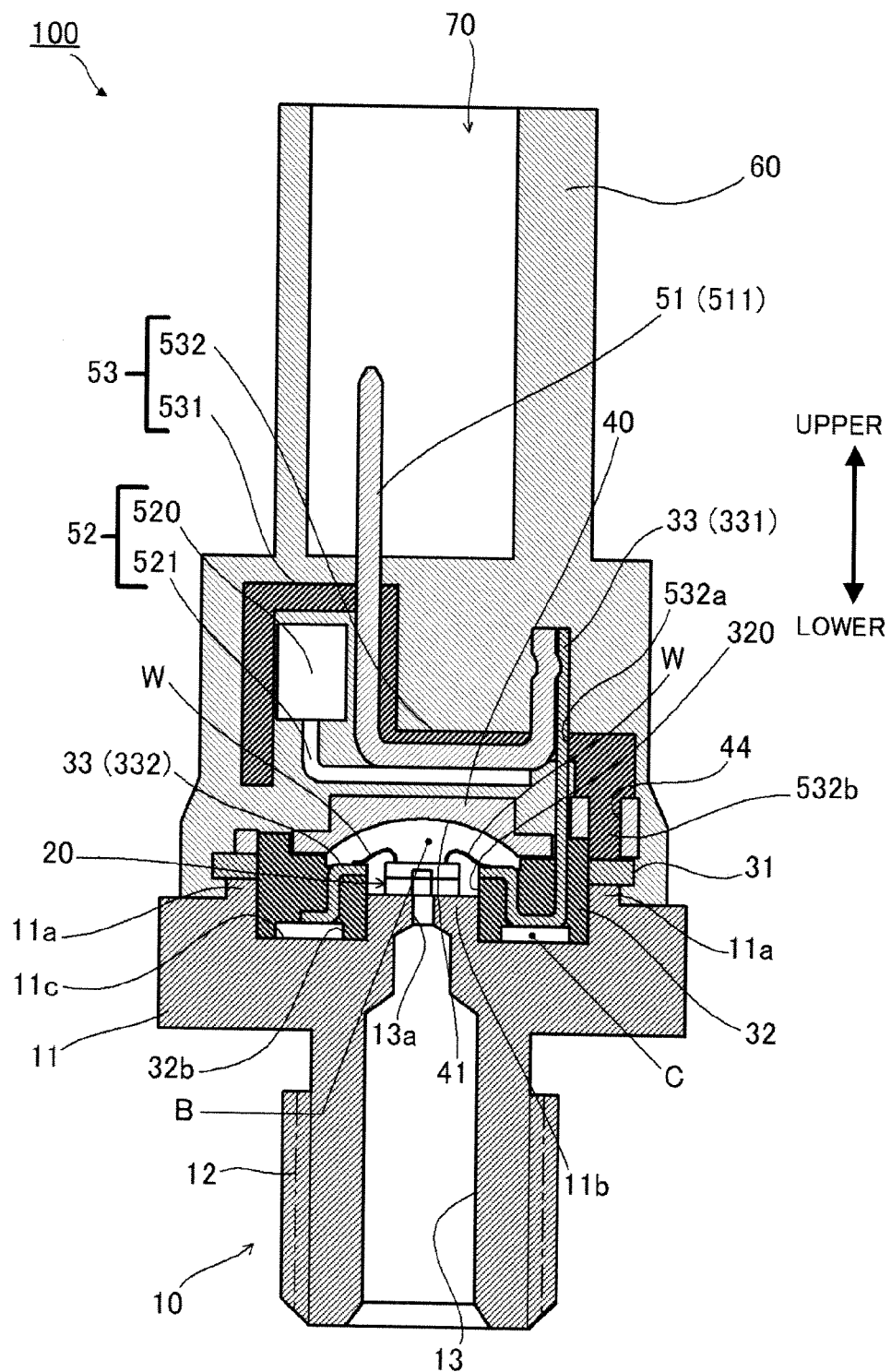
FIG. 1 is a schematic cross section of essential portions of a pressure detection device according to one embodiment of the present invention.

A pressure detection device according to one embodiment of the present invention will be described with reference to the drawings.

A pressure detection device 100 according to the embodiment, as shown in FIG. 1 to FIG. 5, is provided with: a fluid inflow member 10; a semiconductor type pressure sensor (hereinafter, simply referred to as a pressure sensor) 20; a base plate unit 30; a lid section 40; a terminal unit 50; and a resin cover section 60.

It is to be noted that the base plate unit 30 is one example of a first unit, and the terminal unit 50 is one example of a second unit. In addition, hereinafter, in order to clarify understanding of a construction of the pressure detection device 100, the layout of each section will be explained as required in accordance with a vertical direction mentioned in association with the arrows at both ends shown in FIG. 1.

The fluid inflow member 10 is a member which is made of a metal material such as stainless steel (SUS), and is integrally formed of a hexagonal columnar barrel section 11 and a screw section 12 which is a substantially columnar portion positioned at a lower side of the barrel section, the screw section having a screw groove which is a helical groove at an outer circumference thereof. It is to be noted that in FIG. 1, the screw section 12 is illustrated, although the screw groove is not shown.

In the fluid inflow member 10, a flow passageway 13 which is a hole section to penetrate the barrel section 11 and the screw section 12 in a vertical direction is formed. In the flow passageway 13, from a lower side thereof, a fluid (for example, oil) can be flowed inside. The flow passageway 13 is formed in a tapered shape as it goes upward.

Figure 2:
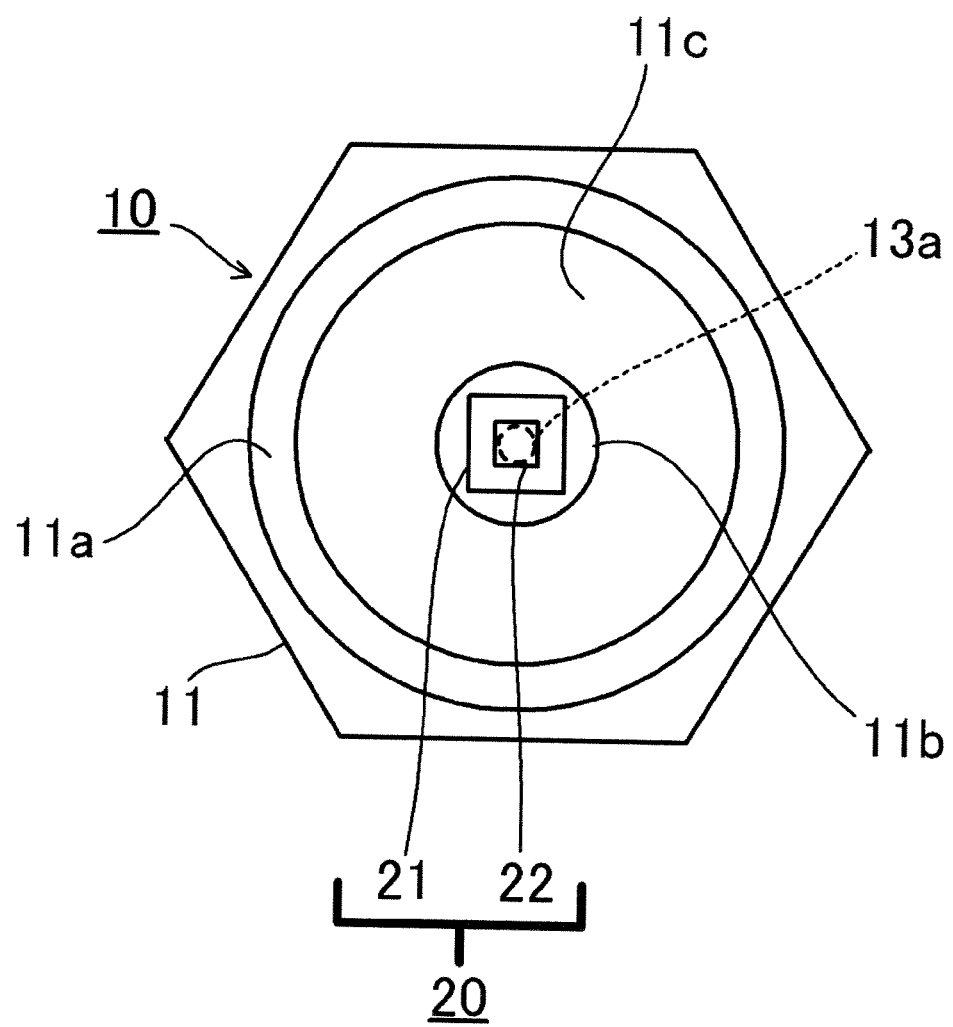
FIG. 2 is a plan view between a fluid inflow member and a semiconductor type pressure sensor.

The barrel section 11 has: a protrusion portion 11a which protrudes from an upper face thereof, and is ring-shaped in a planar view as shown in FIG. 2; and a base 11b which is positioned at a center of the protrusion portion 11a in a planar view, and is approximately as high as the protrusion portion 11a, as shown in FIG. 1. In this manner, between the protrusion portion 11a and the base 11b, a recessed portion 11c is formed.

On the base 11b, a pressure sensor 20 is placed, and is fixed by a predetermined method. At a center part of the base 11b, an opening portion 13a which is an upper end part of the flow passageway 13 is positioned.

The pressure sensor 20 arranges a semiconductor chip 22 having a diaphragm thinly forming a semiconductor board such as silicon on a glass base 21. At sites corresponding to the diaphragm, four resistors are formed as pressure sensing elements having a piezoelectric resistance effect by dispersion processing of impurities such as boron, and as to the pressure sensor 20, a bridge circuit is constructed with each of the resistors and a wiring pattern employing an electrically conductive material such as aluminum.

The pressure sensor 20 is subjected to a pressure of a fluid which is introduced by the flow passageway 13 from a lower side thereof, by the diaphragm, and detects the pressure of the fluid by an output voltage of the bridge circuit together with a displacement of the diaphragm.

Figure 3:
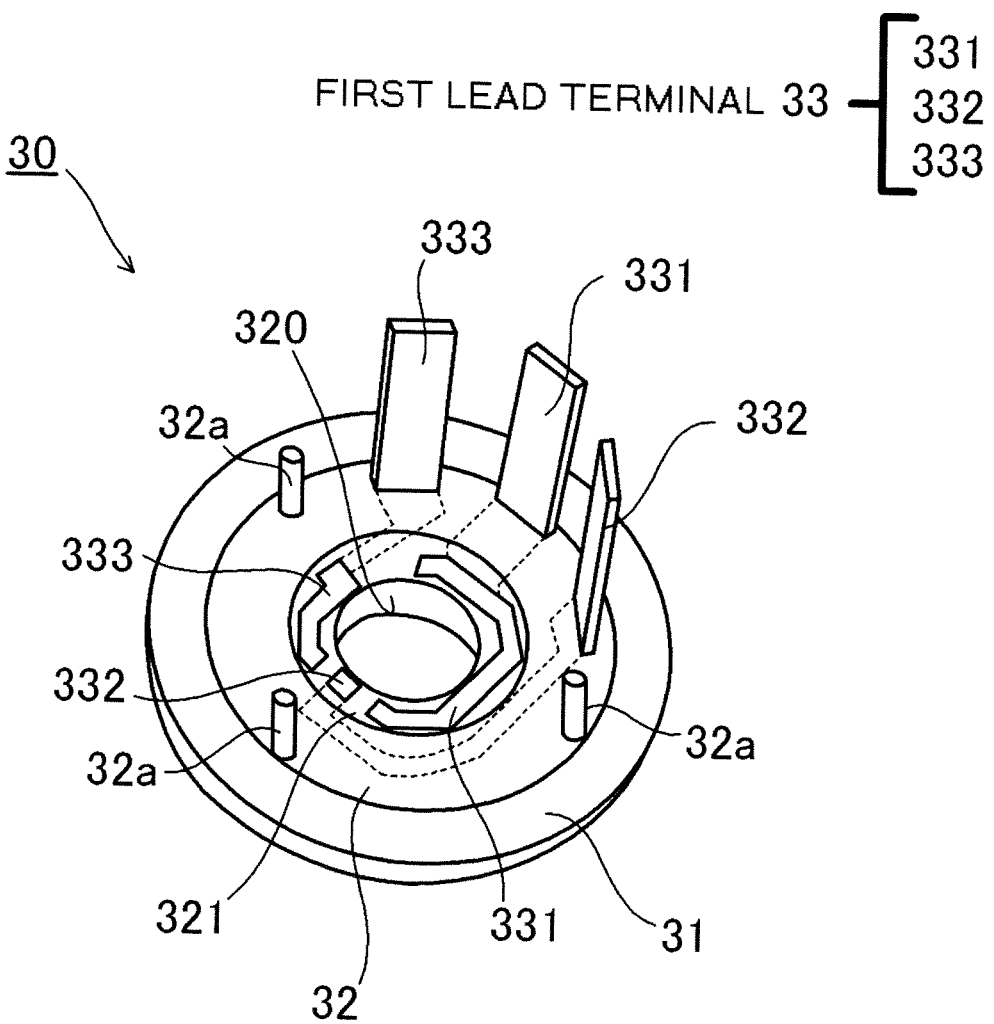
FIG. 3 is a perspective view of a base plate unit.

The base plate unit 30, as mainly shown in FIG. 3, is provided with a ring member 31, a first resin section 32, and a first lead terminal 33. With the ring member 31 and the first resin section 32, a base plate which is disposed on the fluid inflow member 10, and retains the first lead terminal 33, is constructed.

The ring member 31, the first resin section 32, and the first lead terminal 33 are integrally molded by insert molding. Namely, the base plate unit 30 is a unit composed of the respective sections thus integrally molded.

The ring member 31 is made of a metal material such as SUS, and inside thereof, a donut-shaped first resin section 32 is positioned. The ring member 31 is bonded with the fluid inflow member 10 by a lower face part thereof being bonded with the protrusion portion 11a mentioned previously (for example, by resistance welding). In this manner, the base plate unit 30 is connected to the fluid inflow member 10.

The first resin section 32 is made of a PPS (Poly Phenylene Sulfide) resin, for example, and at a center part thereof, an opening portion 320 surrounding the pressure sensor 20 is formed. At the periphery of the opening portion 320 of the first resin section 32, a proximal section 321 from which one end part of the first lead terminal 33 is exposed, and which positions such one end part in the vicinity of the pressure sensor 20, is provided. The first resin section 32 retains the first lead terminal 33.

Also, the first resin section 32 has a pin 32a which is erected upward, and which is for determining a position of a lid section 40 relative to the base plate unit 30.

In addition, the first resin section 32 is a section in which a recessed portion 32b is formed at a lower face side thereof, and if the base plate unit 30 is arranged on the fluid inflow member 10, a space C is formed between this recessed portion 32b and a recessed portion 11c which is formed in the barrel section 11 of the fluid inflow member 10.

The first lead terminal 33 is made of a phosphor bronze material, for example, and is a sectional substantial L-shaped member, as shown in FIG. 1. There are three first lead terminals 33, as shown in FIG. 3, and these three terminals are respectively assigned as a power line, a signal line, and a ground line.

Hereinafter, a description will be given as required, on the presupposition that, among the three first lead terminals 33, in FIG. 3, the one positioned at the center part is assigned by reference numeral 331, the one positioned at the left side is assigned by reference numeral 332, and the one positioned at the right side is assigned by reference numeral 333. However, although the three first lead terminals 331, 332, 333 are different from each other at their respective positions, since they have similar structures to each other, related matters common to these three terminals will be explained in all by assigning reference numeral 33.

Although one end part of the first lead terminal 33 is positioned in the vicinity of the pressure sensor 20 as mentioned previously, the other end part extends to an upper side, and is positioned at a position which can be connected to a second lead terminal 51, which will be described later, of a terminal unit 50. The first lead terminal 33 is formed to be folded so that each of both end parts is thus positioned.

One end part of the first lead terminal 33 is connected to be electrically conductive to the pressure sensor 20 by way of a wire W (for example, made of aluminum). A wire bonding device is employed for the sake of connection of the wire W.

It is to be noted that impregnation processing which is processing of filling a sealing material in a gap which is produced at the time of insert molding is applied to a contact site between the first resin section 32 and the first lead terminal 33. Similarly, impregnation processing is also applied to a contact site between the ring member 31 and the first resin section 32.

The lid section 40 is a member which is made of a PPS resin, for example, which is coupled to the first resin section 32 of the base plate unit 30 so as to cover the pressure sensor 20 from an upper side, and which forms a closed space in which the pressure sensor 20 is internally positioned. Hereinafter, this closed space is referred to as a pressure reference chamber B (refer to FIG. 1). An interior face of the lid section 40, as shown in FIG. 1, is formed as a concave face 41. The lid section 40 is welded with an upper end face of the first resin section 32 (for example, by laser welding deposition), and by this deposition, the pressure reference chamber B is formed between the lid section 40 and the first resin section 32.

Figure 4:
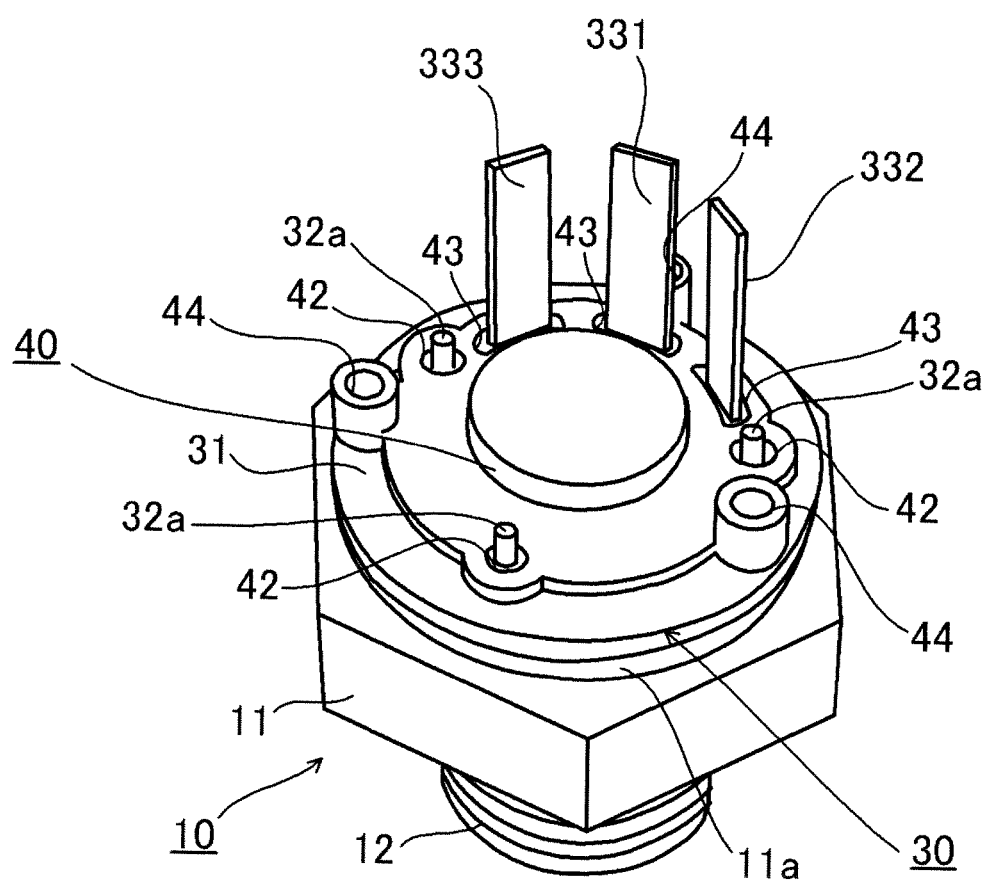
FIG. 4 is a perspective view showing a state in which the fluid inflow member, the base plate unit, and a capping body are assembled with each other.

In the lid section 40, there are formed: a pin insertion hole 42 to insert the pin 32a of the first resin section 32; a terminal insertion hole 43 to insert the first lead terminals 33 (331, 332, 333); and a protrusion portion insertion hole 44 to engage with a protrusion portion 532b which a second resin section 53 to be described later has. It is to be noted that FIG. 4 shows a state in which the lid section 40 is placed on the first resin section 32 and a state before both of these sections are welded with each other.

Figure 5:
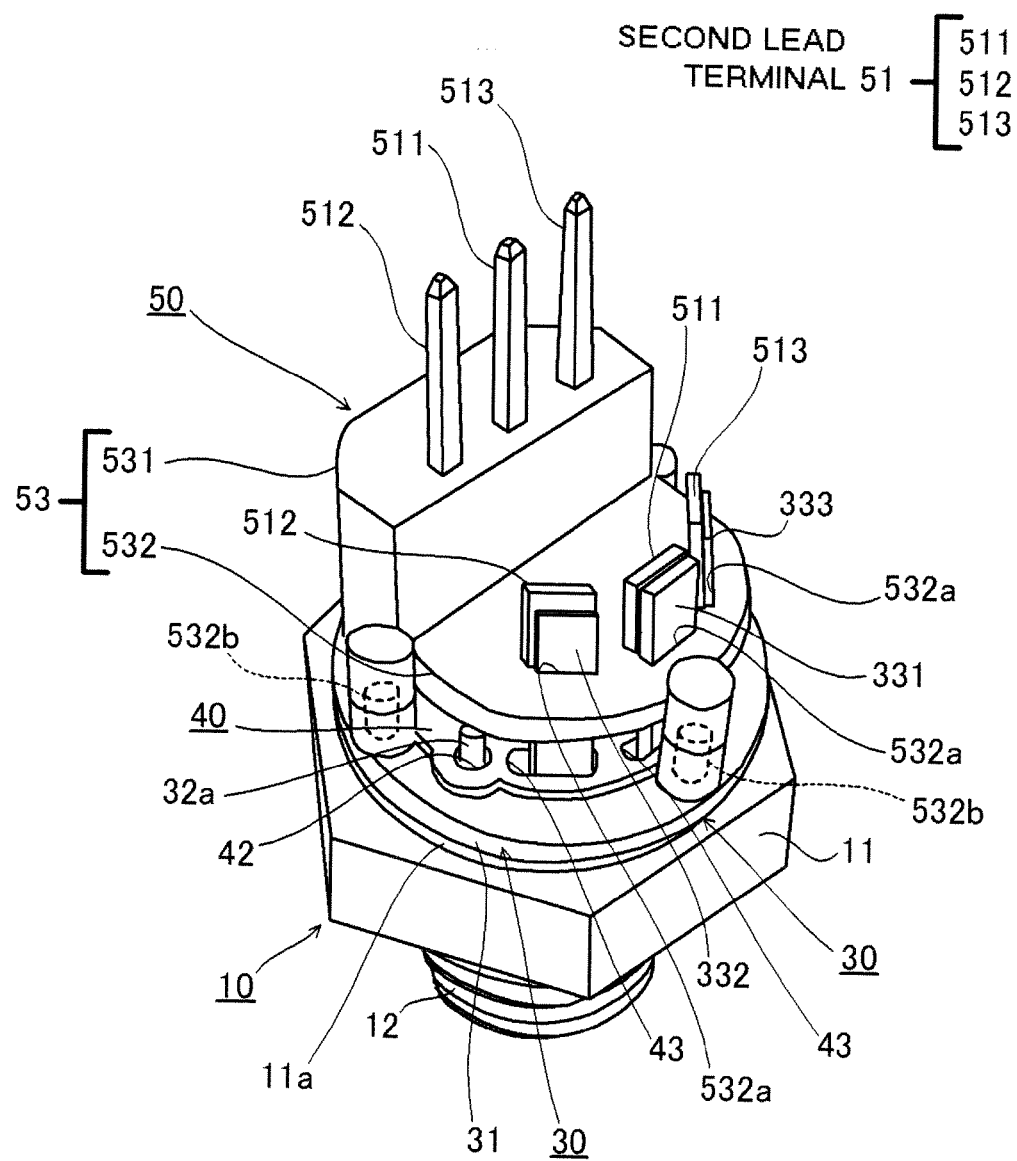
FIG. 5 is a perspective view showing a state in which the fluid inflow member, the base plate unit, the capping body, and a terminal unit are assembled with each other.

The terminal unit 50, as shown in FIG. 1 and FIG. 5, is provided with a second lead terminal 51, a noise absorption capacitor 52, and a second resin section 53.

The second lead terminal 51 is made of a phosphor bronze material, and is a sectional substantial L-shape, for example, as shown in FIG. 1. One end part of the second lead terminal 51 extends to an upper side, and is bonded with the other end part of the first lead terminal 33 (an opposite end part to the pressure sensor 20 side) (for example, by resistance welding). The other end part of the second lead terminal 51 extends to a further upper side than such one end part, and constitutes a connector section 70 which will be described later.

There are three second lead terminals 51, as shown in FIG. 5, and these terminals respectively correspond to the first lead terminal 331, 332, 333. Namely, the three second lead terminals 51 are respectively assigned as a power line, a signal line, and a ground line.

Hereinafter, a description will be given as required, on the presupposition that, among the three second lead terminals 51, the one connected to the first lead terminal 331 is assigned by reference numeral 511, the one connected to the first lead terminal 332 is assigned by reference numeral 512, and the one connected to the first lead terminal 333 is assigned by reference numeral 513. However, although the three second lead terminals 511, 512, 513 are different from each other at their respective positions, since they have similar structures, related matters common to these three terminals will be explained in all by assigning reference numeral 51.

The noise absorption capacitor 52 is made of a lead type ceramic capacitor, for example, and has a capacitor section 520 and a side face L-shaped lead section 521, as shown in FIG. 1. The capacitor section 520 is arranged at a left side part in FIG. 1 of the second lead terminal 51. The lead section 521 connected to the capacitor section 520 is a lead in which a tip end part thereof is connected to the second lead terminal 51 (for example, by resistance welding). The noise absorption capacitor 52 is for absorbing an external noise weighted on a power line and a signal line, and the same two capacitors are arranged in a direction to penetrate the paper face of FIG. 1, for example.

The second resin section 53 is a member which is made of a PPS resin, for example, and which retains the second lead terminal 51 and covers the noise absorption capacitor 52 from an upper side. The second resin section 53 thus covers the noise absorption capacitor 52 to thereby protect the noise absorption capacitor 52 from an injection molding temperature and a pressure at the time of molding of a resin cover section 60.

The second resin section 53, as shown in FIG. 5, forms a shape such that an external semi-columnar first portion 531 and an external semi-disk shaped second portion 532 are jointed with each other. In the embodiment, the noise absorption capacitor 52 (the capacitor section 520) is essentially protected by the first portion 531 as described above.

The second resin section 53 is integrally molded with the second lead terminal 51 by insert molding to thereby retain the second lead terminal 51. The second lead terminal 51 thus retained is a terminal in which a part thereof (an opposite end part to an end part connected to the first lead terminal 33) penetrates the first portion 531 upward, and constitutes a connector section 70 which will be described later.

Also, an opposite end part to an end part constituting the connector section 70 of the second lead terminal 51 penetrates the second portion 532 upward, and is welded with the first lead terminal 33. It is to be noted that impregnation processing is applied to a contact site between the second resin section 53 and the second lead terminal 51.

In the second portion 532 of the second resin section 53, holes 532a to penetrate the first lead terminal 33 are provided. Namely, there are three holes 532a respectively corresponding to the first lead terminals 331, 332, 333. Also, in the second portion 532, at an end part of an outer circumferential side thereof, a protrusion portion 532b protruding downward is provided, and this protrusion portion 532b is inserted into a protrusion insertion hole 44 of the lid section 40 mentioned previously, whereby the terminal unit 50 is temporarily secured to the lid section 40.

The resin cover section 60 is a cover section which is positioned at an upper side of the fluid inflow member 10 made of a PPS resin, for example. Although the resin cover section 60 covers the base plate unit 30, the lid section 40, and the terminal unit 50, this cover section is molded in such a manner that a part of the second lead terminal 51 of the terminal unit 50 is exposed to the outside (namely, a part of the second lead terminals 511, 512, 513 is exposed to the outside, i.e., the outside of the resin cover section 60).

The connector section 70 (a direct coupler section) is constructed with a portion exposed from the resin cover section 60 to the outside of the second lead terminal 51 and a portion surrounding the exposed second lead terminal 51 of the resin cover section 60. This connector section 70 can be connected to a terminal of a predetermined external device, whereby a power voltage is applied from the connected external device to the pressure sensor 20, and a detection signal of the pressure sensor 20 can be supplied to the connected external device. The external device having thus acquired the detection signal obtains a pressure of a fluid (for example, a hydraulic pressure), based on the acquired detection signal.

The resin cover section 60 is obtained by outsert molding with the fluid inflow member 10. The molded resin cover section 60 couples the fluid inflow member 10 (an upper end part of the fluid inflow member 10) and the base plate unit 30 which is one example of the first unit to each other and the lid section 40 and the terminal unit 50 which is one example of the second unit to each other. In a state in which the respective sections are thus coupled to each other, in particular, the lid section 40 is pressed from an upper side by the resin cover section 60.

Although the lid section 40 is coupled to the first resin section 32 by laser welding deposition as mentioned previously, this lid section is thus further pressed by the resin cover section 60, whereby the lid section is rigidly fixed to the first resin section 32 of the base plate unit 30. Thus, an excessive pressure is produced relative to a fluid (for example, oil) flowing inside from the flow passageway 13, the pressure sensor 20 is broken, and even if the fluid reaches the inside of the pressure reference chamber B, the outflowing of the fluid from an upper part and a side part of the lid section 40 can be precluded.

The pressure detection device 100 according to the embodiment has a failsafe structure which restrains to the utmost the leakage of a fluid of which a pressure is targeted to be detected.

The pressure detection device 100 made of the constituent elements mentioned above is provided with: a fluid inflow member 10 having: a flow passageway 13 into which a fluid can flow; a semiconductor type pressure sensor 20 which is provided on a top face of the fluid inflow member 10, and detects a pressure of the fluid having flown into the flow passageway 13; a base plate unit 30 (one example of a first unit) having: a first resin section 32 which is provided on a top face of the fluid inflow member 10, and surrounds the semiconductor type pressure sensor 20; and a first lead terminal 33 which is retained by the first resin section 32, one end part of which is electrically connected to the semiconductor type pressure sensor 20 (via the wire W); a lid section 40 which is coupled to the first resin section 32 so as to cover the semiconductor type pressure sensor 20 from an upper side, and forms a closed space in which the semiconductor type pressure sensor 20 is internally positioned; a terminal unit 50 (one example of a second unit) having; a second resin section 53 which covers the lid section 40 from an upper side; and a second lead terminal 51 which is retained by the second resin section 53, and is electrically connected to the other end part of the first lead terminal 33; and a resin cover section 60 which couples the fluid inflow member 10 and the base plate unit 30 to each other and the lid section 40 and the terminal unit 50 to each other and covers the base plate unit 30, the lid section 40, and the terminal unit 50, while a part of the second lead terminal 51 of the terminal unit 50 is exposed to the outside, wherein the lid section 40 is coupled to the first resin section 32, and is pressed by the resin cover section 60 from an upper side.

With this construction, as mentioned above, the leakage of the fluid of which a pressure is targeted to be detected can be restrained to the utmost. Namely, the pressure detection device 100 has a failsafe structure.

Also, the construction of the pressure detection device 100 is obtained as a structure in which assembling is easy, and which is capable of restraining the number of parts and the number of processes.

This is because, in so far as the pressure detection device according to Patent Literature 1 mentioned above is concerned, in a connection structure from a pressure sensor to an electrode lead of a connector section, there has been a need to perform the complicated steps of: 1) connecting a circuit board which is made electrically connective to a pressure sensor and a first lead terminal to each other by a wire; 2) connecting the first lead pin and a penetration capacitor to each other, and connecting the first lead pin and the first lead terminal to each other by soldering; and 3) connecting the first led pin and the electrode lead by soldering, and therefore, there has been room for improvement; and however, in so far as the pressure detection device 100 in the embodiment is concerned, an electrical conduction structure from the pressure sensor 20 to the connector section 70 is mainly composed of: the first lead terminal 33 that is retained by the base plate unit 30; and the second lead terminal 51 that is retained by the terminal unit 50. With this construction, it is sufficient if the base plate unit 30 that is one example of the first unit provided as a unit and the terminal unit 50 or the like that is one example of the second unit be assembled with each other, and connection portions of the respective terminals be welded with each other.

Thus, with the construction of the pressure detection device 100 according to the embodiment, there is no need to supply soldering and perform temperature control for soldering (or it is possible to restrain the supply and control to the required minimum), an assembling property is improved, and manufacturing costs can be reduced.

In addition, with the construction of the pressure detection device 100 according to the embodiment, since there is no need to provide a circuit board as in the pressure detection device according to Patent Literature 1 mentioned previously, an increased number of parts can be restrained.

Hereinafter, one example of a method for producing the pressure detection device 100 will be briefly described.

1) The pressure sensor 20 is arranged at the fluid inflow member 10.

2) The base plate unit 30 (one example of the first unit) that is integrally molded by insert molding is prepared, and the base plate unit 30 is disposed on the fluid inflow member 10.

Specifically, the protrusion portion 11a of the fluid inflow member 10 and the ring member 31 of the base plate unit 30 are bonded with each other by resistance welding. Then, the pressure sensor 20 and the first lead terminal 33 are electrically connected to each other via the wire W by a wiring bonding device.

3) The lid section 40 to cover the pressure sensor 20 from an upper side is coupled to the first resin section 32 of the base plate unit 30 by laser welding deposition, and a closed space in which the pressure sensor 20 is internally positioned is formed by the lid section 40.

4) The terminal unit 50 (one example of the second unit) that is integrally molded by insert molding is prepared, and is disposed on an upper side of the lid section 40.

Specifically, the protrusion portion 532*b* that the second resin section 53 of the terminal unit 50 has is inserted into the protrusion portion insertion hole 44 of the lid section 40, and the terminal unit 50 is temporarily secured to the lid section 40. Then, the first lead terminal 33 and the second lead terminal 51 are connected by resistance welding.

5) Subsequent to disposing the terminal unit 50, the resin cover section 60 is molded by outsert molding.

The pressure detection device 100 is produced as follows, for example. It is to be noted that some of the processes 1) to 4) mentioned above can be replaced in sequential order as required.

Modification Example

It is to be noted that the present invention is not limitative to the foregoing embodiment, and a variety of modifications are possible. Hereinafter, one example of such modifications is shown.

Although the foregoing description showed an example of connecting the noise absorption capacitor 52 made of a lead type ceramic capacitor to the second lead terminal 51, the present invention is not limitative thereto. As a noise absorption capacitor, a chip capacitor may be connected to the second lead terminal 51.

Also, a noise absorption capacitor can be connected to the first lead terminal 33 as well as the second lead terminal 51. In this case, for example, by utilizing a space C (refer to FIG. 1) which is formed between the recessed portion 32*b* of the first resin section 32 and the recessed portion 11*c* of the fluid inflow member 10, a chip capacitor to connect with the first lead terminal 33 may be arranged in the space C. In this manner, an external noise can be further reduced.

In addition, although the foregoing description showed an example in which the connector section 70 the direct coupler section) is constructed with a portion which is exposed to the outside from the resin cover section 60 of the second lead terminal 51 and a portion to surround the exposed second lead terminal 51 of the resin cover section 60, the present invention is not limitative thereto.

It may be that only an electric cord connected to the second lead terminal 51 is exposed to the outside and then a detection signal is supplied from this electric cord to the outside, etc., without the resin cover section constituting the direct coupler section.

It is to be noted that the present invention is not limited by the foregoing embodiments and drawings. It is possible to apply alteration(s) (including deletion(s)) of the constituent element(s) in the embodiments and drawings as required without deviating from the gist of the present invention.

INDUSTRIAL APPLICABILITY

Although the foregoing embodiments described a pressure detection device for vehicles or the like as an application example thereof by way of example, the present invention is applicable to special vehicles such as ship construction machines, agricultural machines or construction machines as well as motor vehicles, and is, of course, applicable to a variety of pressure detection devices as well as such vehicles.

DESCRIPTION OF REFERENCE NUMERALS

100 Pressure detection device
10 Fluid inflow member
13 Flow passageway
20 Semiconductor type pressure sensor
30 Base plate unit (one example of first unit)
31 Ring member
32 First resin section
33 First lead terminal
40 Lid section
50 Terminal unit (one example of second unit)
51 Second lead terminal
52 Noise absorption capacitor
53 Second resin section
60 Resin cover section
70 Connector section
B Pressure reference chamber (closed space)
C Space

The invention claimed is:

1. A pressure detection device comprising:
a fluid inflow member having a flow passageway;
a semiconductor type pressure sensor which is provided on a top face of the fluid inflow member, and detects a pressure of a fluid in the flow passageway;
a first unit having:
    a first resin section which is provided on the top face of the fluid inflow member, and surrounds the semiconductor type pressure sensor; and
    a first lead terminal which is retained by the first resin section, one end part of which is electrically connected to the semiconductor type pressure sensor;
a lid section which is coupled to the first resin section so as to cover the semiconductor type pressure sensor from an upper side, and forms a closed space in which the semiconductor type pressure sensor is internally positioned;
a second unit having:
    a second resin section to cover the lid section from an upper side; and
    a second lead terminal which is retained by the second resin section, and is electrically connected to an other end part of the first lead terminal; and
a resin cover section which couples the fluid inflow member and the first unit and the lid section and the second unit, and covers the first unit, the lid section, and the second unit, while a part of the second lead terminal of the second unit is exposed to an outside,
wherein the lid section is coupled to the first resin section, and is pressed by the resin cover section from an upper side.

2. The pressure detection device according to claim 1, wherein
the first lead terminal is integrally molded with the first resin section to be thereby retained by the first resin section, and
the second lead terminal is integrally molded with the second resin section to be thereby retained by the second resin section.

3. The pressure detection device according to claim 1 or claim 2, wherein a noise absorption capacitor is connected to the first lead terminal and/or the second lead terminal.

4. The pressure detection device according to any one of claims 1 to 3, wherein the first lead terminal and the second lead terminal are electrically connected to each other by welding.

5. The pressure detection device according to any one of claims 1 to 4, wherein the lid section is made of a resin material, and is coupled to the first resin section by laser welding deposition.

6. The pressure detection device according to any one of claims 1 to 5, wherein a connector section is formed of a part of the second lead terminal that is exposed from the resin cover section and a part of the resin cover section.

7. A method for producing pressure detection devices, the method comprising the steps of:

on a top face of a fluid inflow member having a flow passageway, providing a semiconductor type pressure sensor which detects a pressure of a fluid in the flow passageway;

at an upper side of the fluid inflow member, disposing a first unit having a first resin section surrounding the semiconductor type pressure sensor and a first lead terminal which is retained by the first resin section, one end part of which is electrically connected to the semiconductor type pressure sensor;

coupling a lid section covering the semiconductor type pressure sensor from an upper side to the first resin section and then by the lid section, forming a closed space in which the semiconductor type pressure sensor is internally positioned;

at an upper side of the lid section, disposing the second unit having a second resin section and a second lead terminal which is retained by the second resin section, and is electrically connected to an other end part of the second lead terminal; and subsequent to disposing the second unit, coupling the fluid inflow member and the first unit and the lid section and the second unit and covering the first unit, the lid section, and the second unit, while a part of the second lead terminal of the second unit is exposed to an outside and a resin cover section to press the lid section from an upper side is molded by outsert molding.

* * * * *